US011332384B2

(12) United States Patent
Krummel

(10) Patent No.: US 11,332,384 B2
(45) Date of Patent: May 17, 2022

(54) DEVICE AND METHODS FOR INCREASING THE SOLUBILITY OF CRYSTALS IN WATER

(71) Applicant: Revelant IP Holdings LLC, Webster, TX (US)

(72) Inventor: Amber T. Krummel, Fort Collins, CO (US)

(73) Assignee: Revelant IP Holdings LLC, Webster, TX (US)

( * ) Notice: Subject to any disclaimer, the term of this patent is extended or adjusted under 35 U.S.C. 154(b) by 381 days.

(21) Appl. No.: 16/320,042

(22) PCT Filed: Jul. 27, 2017

(86) PCT No.: PCT/US2017/044158
§ 371 (c)(1),
(2) Date: Jan. 23, 2019

(87) PCT Pub. No.: WO2018/022873
PCT Pub. Date: Feb. 1, 2018

(65) Prior Publication Data
US 2019/0241443 A1 Aug. 8, 2019

Related U.S. Application Data

(60) Provisional application No. 62/511,782, filed on May 26, 2017, provisional application No. 62/367,430, filed on Jul. 27, 2016.

(51) Int. Cl.
*C02F 1/00* (2006.01)
*C02F 1/30* (2006.01)
(Continued)

(52) U.S. Cl.
CPC ............... *C02F 1/005* (2013.01); *C02F 1/30* (2013.01); *C02F 1/48* (2013.01); *G02B 5/208* (2013.01); *C02F 2303/22* (2013.01); *Y02W 10/37* (2015.05)

(58) Field of Classification Search
CPC ...... C02F 1/00; C02F 1/30; C02F 1/48; C02F 1/005; G02B 5/20
See application file for complete search history.

(56) References Cited

U.S. PATENT DOCUMENTS 5,052,491 A 10/1991 Harms et al.
5,274,606 A 12/1993 Drumheller et al.
(Continued)

FOREIGN PATENT DOCUMENTS

CA 896407 5/1962
GB 2496092 5/2013
(Continued)

OTHER PUBLICATIONS

Allen, "Introduction to Molecular Dynamics Simulation," NIC Series, vol. 23, 2004, ISBN 3-00-012641, pp. 1-27.
(Continued)

*Primary Examiner* — Walter D. Griffin
*Assistant Examiner* — Cameron J Allen
(74) *Attorney, Agent, or Firm* — Brownstein Hyatt Farber Schreck, LLP

(57) ABSTRACT

Band-pass filters for guiding or controlling crystal polymorphism in water are provided. Band-pass filters convert a passive energy source to a spectral energy pattern tuned to resonant with different types of molecular oscillations pertinent to water. Tuned energy patterns convert problematic insoluble crystals to more thermodynamically stable and soluble crystals. Methods include use of the band-pass filter in water and design of band-pass filter parameters for optimal use on a particular water source.

20 Claims, 4 Drawing Sheets

(51) Int. Cl.
*C02F 1/48* (2006.01)
*G02B 5/20* (2006.01)

(56) References Cited

U.S. PATENT DOCUMENTS

| | | | |
|---|---|---|---|
| 5,306,980 | A | 4/1994 | Montgomery |
| 6,869,617 | B2 | 3/2005 | Kipp et al. |
| 7,353,873 | B2 | 4/2008 | Borst et al. |
| 7,560,203 | B2 | 7/2009 | Tamoto et al. |
| 7,972,390 | B2 * | 7/2011 | Blum .................. C01B 13/0214 23/295 R |
| 7,973,176 | B2 | 7/2011 | Takeda et al. |
| 8,734,535 | B2 * | 5/2014 | Blum ...................... C01D 3/24 23/295 R |
| 9,011,700 | B2 | 4/2015 | Eng et al. |
| 9,415,106 | B2 | 8/2016 | Choi et al. |
| 9,784,092 | B2 | 10/2017 | Southgate et al. |
| 10,287,193 | B2 | 5/2019 | Fahs et al. |
| 2007/0242395 | A1 | 10/2007 | Bailey |
| 2009/0242407 | A1 | 10/2009 | Shiga |
| 2010/0151310 | A1 | 6/2010 | Takita et al. |
| 2012/0132196 | A1 | 5/2012 | Vladyslavovych |
| 2012/0167818 | A1 | 7/2012 | Blum et al. |
| 2013/0213899 | A1 * | 8/2013 | Fahs, II .................. C02F 1/001 210/748.01 |
| 2014/0014375 | A1 | 1/2014 | Boerrigter et al. |
| 2014/0371192 | A1 | 12/2014 | Choi et al. |
| 2019/0152808 | A1 | 5/2019 | Krummel |

FOREIGN PATENT DOCUMENTS

| | | |
|---|---|---|
| WO | WO 16/036961 | 3/2016 |
| WO | WO 17/023186 | 2/2017 |

OTHER PUBLICATIONS

Atkins, et al., "8.12 Temperature and Solubility," *Chemical Principles: The Quest for Insight*, 2d Edition, 1999, p. 417.

Weir et al., "Infrared Studies of Aragonite, Calcite, and Vaterite Type Structures in the Borates, Carbonates, and Nitrates," *Journal of Research of the National Bureau of Standards—A*, Physics and Chemistry, vol. 65A, No. 3, 1961, pp. 173-183.

U.S. Appl. No. 16/317,490, filed Jan. 11, 2019, Krummel.

International Search Report and Written Opinion dated Nov. 28, 2017, PCT/US2017/044158, 10 pages.

* cited by examiner

DEVICE AND METHODS FOR INCREASING THE SOLUBILITY OF CRYSTALS IN WATER

CROSS-REFERENCE TO RELATED APPLICATIONS

The application is a 35 U.S.C. § 371 application of PCT/US2017/044158, filed Jul. 27, 2017, which claims the benefit under 35 U.S.C. § 119(e) of U.S. Provisional Patent Application No. 62/367,430, filed Jul. 27, 2016, U.S. Provisional Patent Application No. 62/511,782, filed May 26, 2017, the contents of which are incorporated by reference as if fully disclosed herein.

FIELD OF THE INVENTION

The use of specified energy patterns for guiding crystal structures in water to their more stable and soluble polymorphs in water.

BACKGROUND OF THE INVENTION

Obtaining and maintaining drinking water is required for good health. It is estimated that a little over half the world's population obtains water through a centralized piped system. Ensuring and maintaining the quality and safety of this piped water is therefore critical to a large proportion of the world's population. Of particular concern for the population using piped water, is water having some levels of minerals, known as "hard water."

It is estimated that about 85% of the United States has water or water issues that relate to hard water. As such, hard water is a persistent problem for large portions of the population in that the dissolved minerals in the water can limit water flow in pipes by forming deposits on pipe surfaces and faucets, called scale. Scale build-up can also damage water heaters, water heater piping, and water-related appliances, like washing machines, where water use and temperature variations exacerbate the scale problem.

Conventional techniques for confronting hard water include the use of ion exchange technology or reverse osmosis technology. Ion exchange technology typically includes the exchange of sodium ions for calcium and magnesium ions off of a resin bead. Resin beads ultimately become depleted of sodium and require regeneration by backwashing in a brine, or other like solution. Ion exchange technology can be expensive, results in sodium content in the water, and requires regeneration. Reverse osmosis technology removes minerals in drinking water through the use of specialized membranes systems and pressure modification. However, reverse osmosis technology is expensive and not well suited for most dwellings.

In light of this backdrop, the present disclosure has been developed.

SUMMARY OF THE INVENTION

Figure 1A:
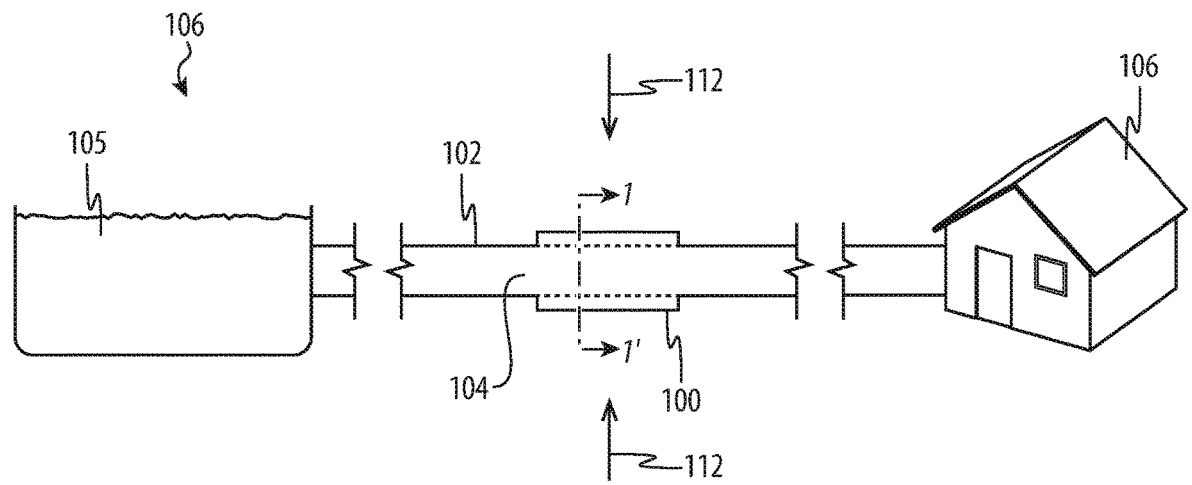
FIG. 1A is an illustrative schematic of a band-pass filter in accordance with embodiments herein placed on a water transport pipe.

Various embodiments described herein encompass the use of selective low frequency energy, termed spectral energy patterns, to drive or guide less stable crystal forms to more stable crystal forms, or polymorphs, found in water. The use of selective spectral energy patterns stabilize molecular dispersions, and promote molecular solubility, of numerous constituents/crystals in water. These more stable crystals provide water having higher crystal solubility and stability. As such, the crystals are less likely to precipitate out of the water during transport or use. In addition, such treated water typically has a modified interfacial tension due to the changed solubility and stability of the various constituents. The modified interfacial tension can be utilized to identify water with a facilitated utility. For example, spectral energy treated water that results in water with a lowered interfacial tension can have increased benefit for use in steam generated power, as the water has a lower interfacial tension and therefore requires less input energy to become steam. Further, water having a lowered interfacial tension may also have a lower freezing temperature, allowing for water pipes to sustain lower temperatures and only bust at the treated waters' modified freezing temperature.

Embodiments include methods where the spectral energy pattern results from passive energy being transmitted through a band-pass filter in accordance with embodiments herein. The transmitted energy through the band-pass filter results in a target spectral energy pattern that guides crystal polymorphisms of a significant number of constituents in the water to the more stable and soluble corresponding crystals. The transmitted energy is tuned to resonate with different types of molecular oscillations pertinent to water. In typical aspects, the transmitted spectral energy pattern is in the near-infrared, mid-infrared, resonant and/or far-infrared frequency. In some cases, the crystals in the water to be treater include calcite, and the spectral energy pattern guides the calcite to its more stable polymorph, aragonite.

In other embodiments, a method for treating a quantity of water with an appropriate energy is disclosed. The appropriate energy is tuned such that when it interacts with the quantity of water, the water's crystal constituents are guided toward greater thermodynamic stability and solubility. In some cases the water has an overall interfacial tension that is modified, and in other cases the overall interfacial tension is lowered. In some aspects, the appropriate energy is the result of transmitted energy through a band pass filter composed of about 85 to 90 weight percent aluminum, and about 10 to 15 weight percent of Si, Fe, Cu, Mn, Mg, Cr, Ni, Zn, Ti, Pb, Sn, or a combination thereof.

Embodiments also include methods where the spectral energy pattern results from a waveform generator. Target spectral energy patterns are identified for a water source where the generated spectral energy pattern guides less stable crystal polymorphs to their more stable counterparts. As above, these changes in crystal stability and solubility within the water, can result in water exhibiting modified interfacial tension. Waveform generators are typically specified such that the energy patterns are in the near-infrared, mid-infrared, resonant and/or far-infrared frequencies.

Embodiments also include various methods for using the spectral energy treated water for targeted utilities, i.e., water with increased crystal solubility as piped water, water with increased crystal solubility as water that enters a water heater, water with increased crystal solubility as water that enters water treatment plants, water with increased crystal solubility as water that enters water-related appliances, like washing machines, water having lowered interfacial tension for use in steam-powered power plants due to the waters reduced boiling point, and other like utilities.

Still other embodiments include water pipes having band-pass filter embodiments attached thereto or integrated therein, water heaters having band-pass filters attached to input water pipes or integrated therein, dwellings having one or more band-pass filters positioned on one or more water pipes or integrated therein, power generating facilities having one or more integrated band-pass filters, and other like aspects.

Other embodiments include waveform generators capable of delivering appropriate spectral energy patterns to water sources, water pipes, water heaters, power generating facilities and the like. In some embodiments, water pipes can have one or more band-pass filters attached thereto or integrated therein along one portion of the piping, and one or more waveform generators along a different portion of the piping.

Finally, embodiments include designing energy landscapes through the use of a band-pass filters or waveform generators so as to produce spectral energy patterns for conversion of one target crystal to another more stable and/or soluble target crystal. Design requirements identify spectral energy patters for conversion of the one crystal polymorph to the more stable crystal polymorph in water. In some embodiments, molecular dynamic simulations are performed to identify the natural vibrational frequencies of target crystals or aggregates (nanoaggregates and nanocrystals), such that the band-pass filters or waveform generators are tuned to replicate the molecular dynamic simulations necessary to convert a less stable polymorph to a more stable crystal polymorph.

DETAILED DESCRIPTION

Embodiments herein include the use of targeted low frequency energy to selectively guide less stable and/or less soluble crystals found in water, to their more stable and/or soluble corresponding crystals found in water. The low frequency energy interacts with crystals found in water to increase the crystals thermodynamic stability in the water. For example, the low frequency energy interacts with calcite crystals in water to form aragonite crystals in water. For purposes herein, water refers to any source of water in need of crystal stability and/or solubility, for example, drinking water (soft or hard), waste water, water treatment water, industrial water, sea water, agricultural water, and the like.

In aspects described herein, low frequency energy is tuned such that it interacts with crystals found in the water to make the crystals more thermodynamically stable and, therefore, more soluble. The treated water crystals are less likely to precipitate out of the water. This is particularly relevant when the water has been heated or put under pressure, conditions that would normally favor precipitation, once treated, no longer favor precipitation. The low frequency energy can result from a waveform generator, or from transmission of energy through a band-pass filter, as will be discussed in greater detail throughout this disclosure.

Embodiments herein include band-pass filters that selectively transmit spectral energy patterns from a passive energy source. In one aspect, the transmitted spectral energy patterns are used to drive or guide less stable crystal forms to more stable crystal forms, or polymorphisms, found in water. By doing so, band-pass filters stabilize molecular dispersions, and promote molecular solubility, of numerous constituents in water. In addition, band-pass filters result in the water having a modified interfacial tension, which can be increased, decreased, or remain the same, dependent on the constituents found in the particular starting water source. Embodiments herein also include manufacturing methods for preparing these same band-pass filters.

In various embodiments, the appropriate spectral energy pattern is provided by a waveform generator and directly input into the water supply or source. The resultant spectral energy pattern is used to guide less stable crystal forms to more stable crystal forms found in water, and generally acts in the same matter as energy transmitted through a band-pass filter. In general, more stable crystal forms have an increased water solubility as compared to less stable crystal forms.

Embodiments include the use of one or more band-pass filters or waveform generators in water wells, water production facilities, wastewater treatment plants, water storage facilities, power plants, irrigation water lines, household water lines, water heaters, water-based or related appliances, and other like water piping, storage or use situations.

As such, aspects herein include methods of using the spectral energy treated water for particular utilities. For example, energy treated water is less likely to form scale, is more likely to deliver solutes in solution, can be more energy efficient where interfacial tension has been reduced, and the like. In addition, methods can include lowering scale buildup on water transport pipes, increasing the solubility of crystals in water, and using treated water as a solvent in various useful environments, e.g., agricultural, industrial, cleaning, and the like. In addition, spectral energy treated water can also be used to more efficiently perform work (where interfacial tension decreases), where the work is based on the treated water being heated to steam more efficiently.

Finally, embodiments include designing energy landscapes through the use of a band-pass filter so as to transmit specific spectral energy patterns for conversion of one target crystal structure to another target crystal structure. Design requirements identify useful spectral energy patterns for conversion of one crystal polymorph to a more stable crystal polymorph in water, where the band-pass filter is then designed to transmit the resultant pattern. In alternative embodiments, molecular dynamic simulations are performed to identify the natural vibrational frequencies of target crystals or aggregates (nanoaggregates and nanocrystals), such that band-pass filters can be tuned to replicate the molecular dynamic simulation necessary to convert a less stable crystal polymorph to a more stable crystal polymorph.

For purposes herein, reference to interfacial tension includes the surface tension of water, such that, a change in interfacial tension includes a change in the corresponding surface tension of the water.

Passive Energy Sources and Spectral Energy Patterns

Some embodiments herein require an external, passive energy source. External energy sources herein include all forms of passive electromagnetic radiation, including: radiant or light energy, thermal energy, electric energy, nuclear energy, and the like. In typical embodiments, the energy source provides electromagnetic energy to the band-pass filter embodiments described herein, where the electromagnetic energy is modified by molecular oscillations within the band-pass filter to a target spectral energy pattern. The transmitted spectral energy out of the band-pass filter converts one crystal form to another, typically more stable, crystal form. Note that multiple crystalline structures are obtainable in similar solvent systems. This aspect of converting one crystalline form to another crystalline form (but having the same chemical structure) is known herein as polymorphisms.

It is also noted that direct spectral energy patterns can be exposed to the water in the absence of a band-pass filter. Where the appropriate target spectral energy pattern has been identified for uses herein, the energy pattern can be directed into the water, without being passed through the band-pass filter, using a waveform generator.

A transmitted spectral energy pattern refers to the totality of energy that transmits from the band-pass filter (or is generated by the waveform generator). Band-pass filters are formed such that the material in the band-pass filter interacts with the passive external energy to oscillate and, once oscillating, transmit a different, more useful to the water, spectral energy pattern. In some embodiments, the transmitted pattern is in resonance with the different types of molecular oscillation found in water. Transmitted energy patterns can include various low frequency energy, including near-infrared, mid-infrared and far-infrared.

In more detail, band-pass filters are characterized such that when exposed to a passive external energy source, the molecules that make up the band-pass filter oscillate, tuning the filter to be in resonance with the different types of molecular oscillations pertinent to water. Although not bound by any one theory, the input passive energy source and the output spectral energy pattern are tied to the frequency of the energy. A factor in how the resultant spectral energy resonates with the crystals in water is based on the frequency of the energy. If the frequency of the transmitted spectral energy pattern, for example after it travels through a pipe wall, does not match the oscillations of the crystals in the water, the energy may be reflected or simply pass through the water. Where a transmitted spectral energy pattern can be matched to a target crystal, and the energy resonates, the energy is capable of interacting and converting the crystal structure to a more thermodynamically stable crystal structure. In some embodiments, the transmitted energy causes a thermodynamic rearrangement of hydrogen bonds to form more thermodynamically stable crystals and crystal aggregates. For purposes herein, crystals refer to single crystals, crystal aggregates, nanoaggregates, crystal groups and the like.

In some embodiments, metallic materials can intervene between a band-pass filter and the water, and in some cases, further modify the spectral energy pattern. For example, passive external energy passes through a band-pass filter and is transmitted as a first spectral energy pattern. The first spectral energy pattern then passed through a metallic material, for example the wall of a copper or steel pipe, prior to interacting with the crystals in the water. In typical embodiments, the intervening metallic material has little, or only a small effect, on the transmitted spectral energy pattern. Further, in some embodiments, the intervening material has no effect on the transmitted spectral energy pattern. Device, method and design embodiments herein can include the intervening metallic material. Intervening metallic materials include: copper, iron, tin, steel, aluminum, and the like, and can have a wall thickness appropriate for the water pressure, water temperature and water volume. It is contemplated that intervening materials that adsorb or block significant amounts of energy be avoided for uses herein, for example, PVC or other polymer based materials. So for example, a PVC pipe would be avoided for placement of a band-pass filter, as the PVC would block most, if not all, of the transmitted spectral energy from reaching the water. In alternative embodiments, no materials intervene between the band-pass filter and the water. The band-pass filter is integrated into a pipe and is continuous with the pipe, forming the conduit for the water to transport there-through.

Band-Pass Filters

Band-pass filters are typically composed of aluminum-based alloys. Typical filters are composed of about 80-95% Al (by weight) and about 5-20% of a combination of one or more of Si, Fe, Cu, Mn, Mg, Cr, Ni, Zn, Ti, Pb, and Sn (by weight). More typically, band-pass filters can also be about 90-95% Al, by weight, and about 5-10% of one or more of Si, Fe, Cu, Mn, Mg, Cr, Ni, Zn, Ti, Pb, and Sn (by weight), and in alternative embodiments, about 90-95% Al, by weight, and about 5-10% of one or more of Si, Cu, Mn, and Mg, by weight. In one aspect, a band-pass filter is composed of the compositions as shown in Table 1.

TABLE 1

Illustrative Band-Pass Filter Compositions

| Element (by weight) | Minimum (by weight) | Maximum (by weight) | Illustrative Embodiment |
|---|---|---|---|
| Al | 84.15% | 91.1% | 87.67% |
| Si | 7.5% | 8.80% | 7.61% |
| Fe | 0 | 0.8% | 0.59% |
| Cu | 1.0% | 2.0% | 1.48% |
| Mn | 0.2% | 0.6% | 0.32% |
| Mg | 0.2% | 0.6% | 0.46% |
| Cr | 0 | 0.35% | 0.04% |
| Ni | 0 | 0.25% | 0.14% |
| Zn | 0 | 1.75% | 1.61% |
| Ti | 0 | 0.25% | 0 |
| Pb | 0 | 0.1% | 0.06% |
| Sn | 0 | 0.25% | 0.02% |

In an alternative embodiment, a band-pass filter comprises an alloy having the following formula (in weight percent): $Al_d(M_aX_bZ_c)$, where M is at least one transition metal; X is at least one element selected from the group consisting of Be, Mg, Ca, Sr, Ba, Ra, or a combination thereof, and Z is at least one non-metal, and where a, b, and c are from 5 to 20 weight percent and d is from about 80 to 95 weight percent.

Elements that constitute the band-pass filter alloy are combined by the weight percent above and heated to a temperature of between about 1320° K and about 1450° K. In more detail, the aluminum is added to a cold furnace with other required elements, and allowed to heat to the appropriate temperature over a 2.5 to 3 hour period. Each additional heating (making another band-pass filter in the same furnace), once the furnace has been heated, takes approximately 1.5-2 hours. A melting furnace can be a 2 million BTU burner that can use natural gas and air combination flame. Other melting furnaces can also be used, as long as they're capable of reaching the appropriate temperature in the appropriate amount of time.

Heated alloy is poured into a band-pass filter mold and allowed to cool at room temperature. Typical cooling takes between 20-45 minutes. Once a band-pass filter part is solidified in a mold, it is removed or shaken out.

In one embodiment, the band-pass filter is molded to form a part that fits snugly around a pipe used for water transport, for example, pipeline used to transport water from point A to point B. Band-pass filter parts can be one integrated piece, or formed of two or more, three or more, or any number of pieces to form the band-pass filter. Typical band-pass filters can have different sizes and shapes to facilitate transmission of the target spectral energy pattern. For example, band-pass filters can be from 2⅜" diameter to 3½" diameter, and 40-50 inches in length, and more typically 45 inches in length. Band-pass filters also tend to weigh between 31-65 lbs. Several illustrative embodiments are described below, although any size and dimension is envisioned as long as the band-pass filter is capable of transmitting the appropriate spectral energy pattern from an external energy source into the water source:

| 60.33 mm-2⅜" Diameter | | | | | |
|---|---|---|---|---|---|
| Unrestricted ID | OD | Length | Tubing weight | Grade | Total Weight |
| 50.64 mm 1.995" | 88.9 mm 3.5" | 1.152 m 45" | 6.99 kg/m 4.7 lb/ft | J-55 EUE | 14.5 kg 31.92 lb |

| 73 mm-2⅞" Diameter | | | | | |
|---|---|---|---|---|---|
| Unrestricted ID | OD | Length | Tubing weight | Grade | Total Weight |
| 61.98 mm 2.441" | 108 mm 4.25" | 1.152 m 45" | 9.67 kg/m 6.50 lb/ft | J-55 EUE | 20.86 kg 45.89 lb |

| 88.9 mm-3½" Diameter | | | | | |
|---|---|---|---|---|---|
| Unrestricted ID | OD | Length | Tubing weight | Grade | Total Weight |
| 76 mm 2.99" | 127 mm 5.25" | 1.152 m 45" | 13.84 kg/m 9.3 lb/ft | J-55 EUE | 29.54 kg 65 lb |

Alternative embodiments include different sized band-pass filters as shown below.

| Illustrative Part 1 | | | | | | | | | |
|---|---|---|---|---|---|---|---|---|---|
| Casing Weight | | OD | | ID | | Casing Clearance | | | |
| kg/m | lb/ft | mm | in | mm | in | mm | in | mm | in |
| 14.1 | 9.5 | 104 | 4.09 | 88.9 | 3.5 | 50.64 | 1.99 | 15 | 0.59 |
| 15.6 | 10.5 | 103 | 4.05 | 88.9 | 3.5 | 50.64 | 1.99 | 14 | 0.55 |

| Illustrative Part 2 | | | | | | | | | |
|---|---|---|---|---|---|---|---|---|---|
| 20.8 | 14 | 127 | 5.01 | 107.95 | 4.25 | 61.98 | 2.44 | 19.35 | 0.76 |
| 23.1 | 15.5 | 126 | 4.95 | 107.95 | 4.25 | 61.98 | 2.44 | 17.78 | 0.7 |

| Illustrative Part 3 | | | | | | | | | |
|---|---|---|---|---|---|---|---|---|---|
| 29.8 | 20 | 164 | 6.456 | 133.35 | 5.25 | 76 | 2.99 | 27.43 | 1.08 |
| 73.7 | 49.5 | 141 | 5.54 | 133.35 | 5.25 | 76 | 2.99 | 7.37 | 0.29 |

Band-pass filters can also be sized to be dropped or fixed into a water source and not be fitted around the pipes used to transport the water. The band-pass filter can include one or more passages for the water to move through, and can be deployed as a sieve or filter that allows for energy transmission into the water.

In one embodiment, band-pass filters as described herein achieve optimum results when molded into a form that surrounds the water. Passive energy is input through the band-pass filter and transmitted and focused toward the water constrained, and moving through, the band-pass filter. As discussed previously, a metallic material can intervene between the band-pass filter and water, for example, a steel pipe used to constrain and carry the water from a city based water system into a home or a copper input pipe for a water heater.

FIG. 1A shows a band-pass filter 100 in accordance with embodiments herein placed around a water pipe 102 used to transport water 104 from a water source 105 into a home 106. In this illustrative embodiment, the band pass filter 100 is placed on the input pipe into the house. The band-pass filter 100 is fitted around the pipe 102. Passive energy, arrows 112, supplied by sunlight is transmitted through the band-pass filter 100, where a resultant spectral energy pattern from the band-pass filter passes through the pipe 102 and into the water 104.

Figure 1B:
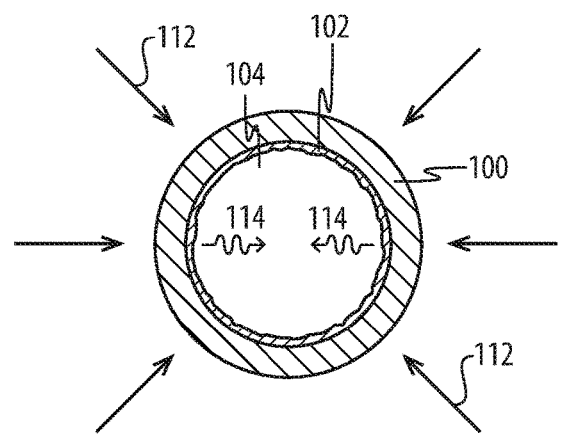
FIG. 1B is a cross-sectional view along line 1-1' of FIG. 1A showing a band-pass filter snugly fit around a water transport pipe.

FIG. 1B is a cross-sectional view along line 1-1' of FIG. 1A. The cross-sectional view shows passive energy, arrow 112, move through the band-pass filter 100 and pipeline 102 to reach the water 104. The passive energy 112 is transmitter through the band-pass filter to have a different energy pattern 114 useful in converting unstable crystal polymorphs in the water 104 to stable crystal polymorphs, and, in some cases, decreasing the interfacial tension in the water 104, particularly, the interfacial tension between crystals in the water and water molecules that make up the water.

Crystal Polymorphism

Crystal forms or polymorphism herein refers to a chemical composition or arrangement of molecules and/or macromolecules, which are capable of at least two different crystalline structures or arrangements. For example, one crystal polymorph may have one crystal arrangement more stable than another crystal arrangement in a particular solvent. In this use, stability refers to thermodynamic stability, or a crystal arrangement that is more thermodynamically stable than another crystal arrangement in water. As such, thermodynamic stability herein generally refers to the molecular solubility of a crystal in a liquid, for example, an unstable crystal will tend to be insoluble and precipitate and deposit, whereas a stable crystal will tend to remain soluble and not precipitate, or precipitate to a significantly lower amount, than its' corresponding unstable polymorph. For purposes herein, crystals can refer to and include nanoaggregates and nanocrystallites.

Band-pass filters are typically positioned to transmit energy to water, where the particular energy pattern resonates crystal structures therein to modify the crystal structures for a particular use. In one aspect, the crystal structure in water in need of treatment is insoluble, substantially insoluble, mostly insoluble, somewhat insoluble, or only slightly insoluble. In another aspect, the crystal polymorphism for calcite is driven to crystal forms that are stable and remain in water rather than precipitate out of the water, aragonite, for example. In another embodiment, a waveform generator can be programed to transmit the appropriate spectral energy pattern directly into the water for the same purpose.

Crystals in water that can be targeted through spectral energy generally include calcium carbonate, magnesium carbonate, calcium hydroxide, magnesium hydroxide, calcium sulfate, magnesium sulfate, calcium nitrate, magnesium nitrate, and the like.

In another aspect, two or more band-pass filters can be combined along the same water line to provide more than one spectral energy pattern, such that two different types of resonance with different molecular oscillations pertinent to a water of interest are treated. So, for example, a first band-pass filter can be tuned to form a more stable aragonite crystal aggregate, and a second band-pass filter, along the same liquid, is tuned to form a more stable sulfur crystal aggregate.

Band-pass filters having the same, or different, transmitted spectral energy pattern can be positioned adjacent one another along a pipe, or can be separated by 1 or more feet, 10 or more feet, 50 or more feet, 75 or more feet, 100 or more feet, 500 or more feet, and/or 1,000 or more feet, 2,000 or more feet of pipeline or water supply.

Band-pass filters herein can be used to form water having greater crystal solubility and stability. Band-pass filters on water transport pipe lines limit or lower the amount of crystal precipitation out of the water as compared to untreated water. The treated water is therefore less likely to result in scale build-up, particularly where the water has been heated, or is under pressure, and the likelihood of scale formation is increased.

Interfacial Tension

Interfacial (which includes surface) tension in water is based on interactions between the water molecules and crystals found in the water, for a given temperature and pressure. Treatment of water with appropriate spectral energy can result in the water having a modified interfacial tension as compared to the same water when left untreated. Since the treated water has a modified interfacial tension, it may require less input energy to reach a boil. For example, where the treated water has more thermodynamically stabilized crystals, the water may show a decrease in interfacial tension. When that water is heated it comes to a boil or evaporates more quickly than the same water that has not been treated with target spectral energy. The water may now be used to perform work more efficiently than water that goes untreated, particularly when the water is used in power generating facilities and water heaters, i.e., where the water is turned to steam and the steam used to generate electricity.

Methods of Use

Embodiments herein include methods that use water that has been treated with an appropriate spectral energy. Once treated, the water has a greater crystal solubility and stability, as compared to untreated water. In addition, because of the changed interactions within the treated water, the treated water often has a modified interfacial tension. Such water has a greater capacity to deliver soluble crystals, for example, as a solvent used in agriculture, a greater capacity to do work where the interfacial tension has been decreased, as drinking water, that results in less damage and required maintenance on pipeline transport, and the like. Treated water, therefore, has a significant benefit to a number of utilities in a number of industries.

Embodiments herein also include methods for using a band-pass filter, in accordance with embodiments herein, to convert one crystal polymorph found in water to another, more stable, crystal polymorph. Embodiments also include methods that convert more than one crystal polymorph in water to more than one stable crystal polymorphs in water. For example, methods include converting a crystal x, crystal y, and crystal z to more stable polymorphs of crystal x, crystal y and crystal z, all in the same water. Where more than one transmitted spectral energy pattern is required to convert more than one crystal polymorph, additional band-pass filters can be added. Band-pass filters can be used to convert 2 or more types of crystals, 3 or more types of crystals, 4 or more types of crystals, 5 or more types of crystals, and the like, into their more stable polymorph in the same water.

Figure 2:
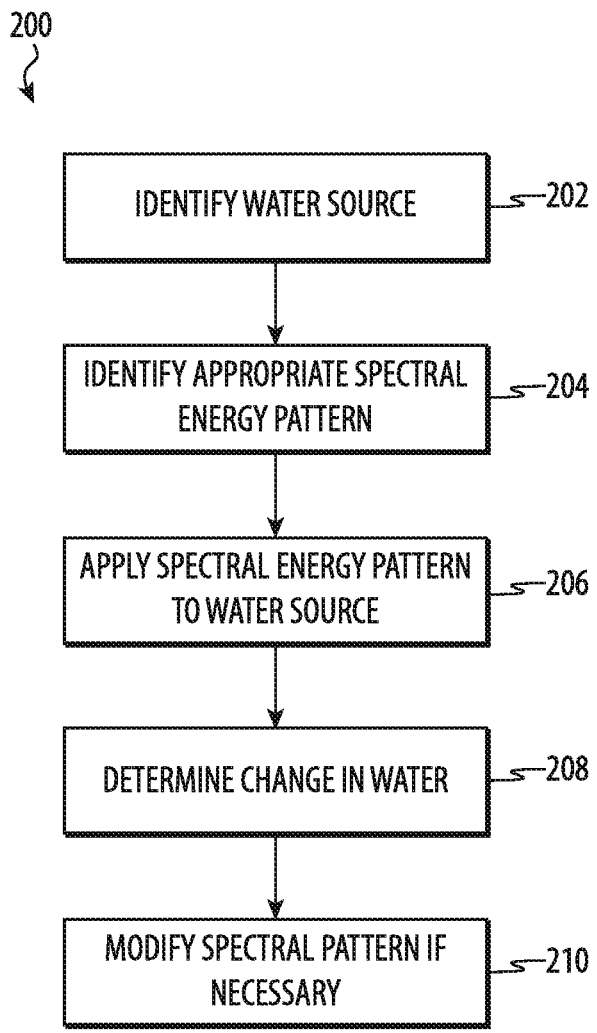
FIG. 2 is a flow diagram of one illustrative method for placing a band-pass filter for use in treating a water source.
Figure 3:
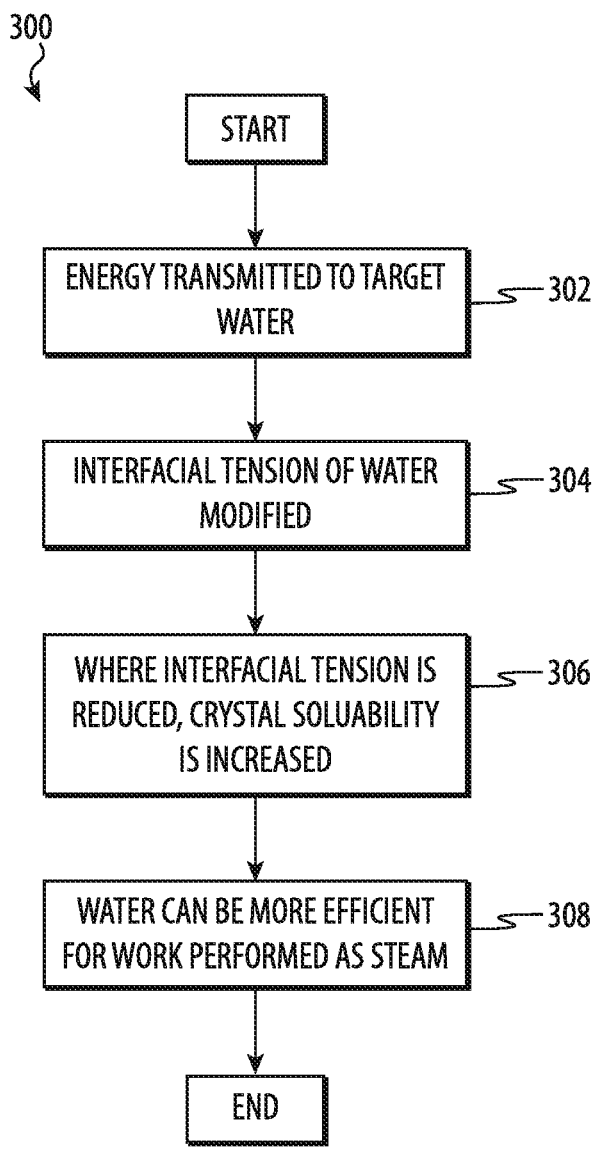
FIG. 3 is a flow diagram of one illustrative method for increasing the work performed by band-pass treated water.

FIG. 2 illustrates one method for using a band-pass filter in accordance with embodiments herein 200. Initially, a water source and hence a water pipe or line in need of embodiments herein is identified 202. In some cases, the water line is already in use in a house or facility. Typically, water lines in use and in need of one or more band-pass filters, include lines used to transport hard water. In some water lines, the line already has some scale deposition, on pipes, water heaters, faucets, showers, and the like. In other cases, the pipeline is new and in need of preventative treatment to limit or eliminate scale buildup. In some cases, the water line is in a house or building, within a water treatment plant, on an pipeline going into or within a water heater or water-based appliance, in an irrigation line, and the like. It is also envisioned that the water line no longer be operational due to existing occlusion in the pipe, or, alternatively, be a new water line in a geographic location where hard water is known to exist. Where the water line has existing deposition problems, band-pass filters of the present invention increase productivity by both limiting deposition, but also by causing break-down and removal of deposited materials.

Once the target water line has been identified, an appropriate band-pass filter, having a useful transmitted spectral energy pattern 204 for the particular water, is obtained. In one embodiment, the band-pass filter has the composition, size and weight to transmit a spectral energy pattern useful in converting calcite to aragonite. In some aspects, the band-pass filter is paired to the thickness and composition of the water pipeline, to ensure that the resultant spectral energy pattern is useful after transmission through the pipeline to the water. Band-pass filter composition, length, thickness can all be formatted to obtain the proper filter with the proper spectral energy transmission patterns.

A properly obtained band-pass filter is then installed within or around the water line. Typically, the site of filter installation requires a passive external energy, for example, installation in sunlight or near a source of thermal energy. Alternatively, the band-pass filter may transmit energy generated by the frictional movement of the water itself. Typical passive external energy requirements are minimal, as the transmitted energy from the band-pass filter is typically in the near-infrared frequency, mid-infrared frequency, resonant frequency, far-infrared frequency, or combinations thereof. These tend to be the spectral energy patterns that resonate with the structure of water and the ions and crystals in the water.

In one embodiment, thermal energy is provided to the band-pass filter and is transmitted out of the band-pass filter as low energy, long wavelength electromagnetic field(s), including near-infrared frequency, mid-infrared frequency, resonant frequency, far-infrared frequency, or combinations thereof. The low energy, long wavelength electromagnetic field is the spectral energy pattern for the band-pass filter, and the transmitted energy resonates with very low frequency librational motions of the water 206. The result is that calcite, for example, and other crystals, convert from a first crystal polymorphic structure to a second, more thermodynamically stable, crystal polymorphic structure. The change in the water can be determined 208 and the spectral pattern can be modified if necessary 210. In the case of calcite, the conversion would be to aragonite. Band-pass filter placement within or around a water line is determined where, as mentioned above, there is a sufficient energy source, but also where converted crystal polymorphs, once converted by the filter, will generally maintain proper structure to be utilized by the water user. As such, proper placement of a band-pass filter is typically in accessible areas, and can be at an exposed spot for direct sunlight or heat. In addition, band-pass filters can be molded around the water line or positioned as two, three, four or more pieces around the water line. It is also noted that band-pass filters herein can be in direct contact with the water and replace, or act as, the water line. In these embodiments, the band-pass filter is positioned and integrated in the water line such that the water flows through the water line, then into and through the band-pass filter and then back into a water line.

Properly installed band-pass filters can improve a number of water characteristics, including water flow, in a typical water pipeline, water flow is improved by at least 1%, 5%, 10%, 15%, 20%, 25%, 30%, 35%, 40%, 45%, 50%, 55%, 60%, 65%, 70%, 75%, 80%, 85%, 90%, 85%, 100%, etc. Water flow is determined by increased flow over the course of each day, each week and/or each month.

Properly installed band-pass filters can improve the water characteristic of decreased scale deposition. Decreased scale deposition can be a result of decreased calcite deposition, or removal of existing scale on pipeline or equipment (a water heater or washing machine for example). One benefit of the properly installed band-pass filter is the avoidance of pipeline and equipment maintenance, including keeping water pipes on-line for extended periods of time, as compared to similar facilities that do not have an installed band-pass filter.

In another embodiment, a method for lowing the interfacial tension of a water supply or source is disclosed 300. Water supplies or sources having one or more crystals are targeted with an appropriate spectral energy pattern 302. The spectral energy is input into the water and results in the interaction between the one or more crystals with the water to have a modified interfacial tension in the absence of the energy input 304. In one aspect, the appropriate spectral energy pattern results from passive energy transmitting through a band-pass filter in accordance with the embodiments herein, and the interfacial tension in the water is reduced by at least 1%, at least 2%, at least 3%, at least 4%, at least 5%, at least 6%, at least 7%, at least 8%, at least 9%, at least 10%, or at least 15%.

Water supplies or sources having reduced interfacial tension have increased crystal solubility as compared to the same water supplies or sources that have not been treated 306. Water with decreased interfacial tension has improved utility for a number of uses, including, a lower requirement for energy input to the water to form steam 308. Water that requires less energy to form steam can be useful, particularly with relation to electricity generation.

Water treated with an appropriate spectral energy pattern (directly or via transmission through a band-pass filter) requires less energy to bring to a boil (due to the decrease in interfacial/surface tension). The reduced requirement for energy to heat the treated water can be realized where heated water performs work: power plants, desalination plants, boiler water treatment, steam heating in a dwelling, and other energy dependent uses. In some aspects, spectral energy treated water, as compared to the same untreated water, requires approximately 99% to 100% of the time and/or energy to boil, approximately 98% to 99% of the time and/or energy to boil, approximately 97% to 98% of the time and/or energy to boil, 96% to 97% of the time and/or energy to boil, 95% to 96% of the time and/or energy to boil, 94% to 95% of the time and/or energy to boil, 93% to 94% of the time and/or energy to boil, 92% to 93% of the time and/or energy to boil, 91% to 92% of the time and/or energy to boil, or 90% to 91% of the time and/or energy to boil. So for example, in a steam-generated power station, the water can be treated with an appropriate spectral energy pattern, for example, through transmission through a band-pass filter, and then heated to generate steam. The steam then spins a steam turbine which drives an electric generator. A reduction in the amount of energy required to heat the water would increase the efficiency of the power station and save significant resources. One or more band-pass filters or waveform generators could be installed at such a power station. The same aspects favor the use of band-pass filters or waveform generators in water heaters and water-based appliances (washing machines, dishwashers, car-washes . . . ), where a decrease in the amount of energy needed to heat the water results in significant resource savings.

Figure 4:
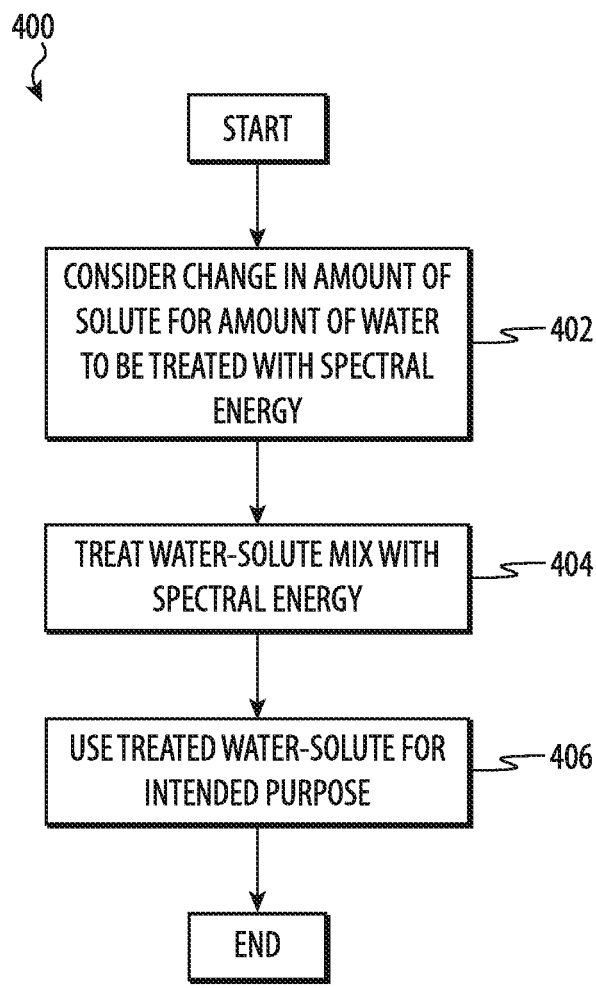
FIG. 4 is a flow diagram of one illustrative method for increasing the solubility of crystals in water by treatment with a band-pass filter.

In another embodiment herein, water treated with appropriate spectral energy is typically a better solvent, and more effective at solvating a broader range of crystals or molecules. Thus, changing properties of treated water including interfacial tension, surface tensions, freezing point, and boiling point. In one embodiment, and as shown in FIG. 4, water and added solute used for a particular task can be treated with an appropriate spectral energy pattern in order to increase the solubility of the solute in the water 400. As above, the spectral energy pattern can be transmitted through a band-pass filter or an appropriately configured waveform generator. In typical embodiments, the spectral energy allows for a use of lower amounts of solute, due to its increased solubility after spectral energy treatment, in the water, or for the elimination of chemical solubilizers, as the case may be. In one embodiment, water having a first amount of solute for a first use is evaluated for how much solute would be required if treated by an appropriate spectral energy pattern 402. The change in the solutes solubility can be calculated and the lower amount of solute mixed with the water prior to treatment with spectral energy.

The water and added solute is treated using a band-pass filter or waveform generator in accordance with embodiments herein 404. The treated water-solute can now be used for its intended purpose, having required either lower amounts of solute to achieve the necessary solute solubility or eliminated chemical solubilizers used to conventionally bring the solute into solution 406. In one example, the solute is a fertilizer for application to crops.

In another embodiment, water and added solute used for a particular task can be treated with an appropriate spectral energy pattern in order to eliminate the need for heating the water to increase solute solubility. In this embodiment, the same amount of solute is added to the water for a particular use (as would be used in an untreated water-solute mixture), but any heating required to put the solute in solution is eliminated by treatment with the appropriate spectral energy pattern. The treated water-solute mixture would be a benefit in that large amounts of energy can be saved, while obtaining the same water-solute mix.

Design of Band Pass Filters for a Particular Use

Embodiments herein include methods of identifying and designing the proper band-pass filter for a targeted use. For example, identifying and designing a band-pass filter that transmits a specific spectral energy pattern useful for optimizing water flow in pipe lines or water for targeted uses.

Band-pass filters can be designed to transmit specific ranges of spectral energy so as to provide targeted spectral energy patterns useful in converting one or more crystal polymorphs into one or more different, and thermodynamically more stable, crystal polymorphs. In some embodiments the converted one or more crystal polymorphs are also more soluble, than their non-converted counterparts.

In one embodiment, a target water source or line is identified, the water source or pipe in need of the embodiments described herein. A water sample is obtained from the source to identify one or more of the crystal polymorphs therein. A first minima energy level is determined for a first crystal, calcite for example. A second minima energy level is determined for the first crystal, where the second minima is associated with a more thermodynamically stable crystal polymorph (as compared to the first), aragonite for example. A spectral energy pattern, for conversion of a first crystal pattern to a second crystal pattern, is now available.

Band-pass filter composition, length, thickness, weight, and manufacture are used to prepare target band-pass filters of the invention. Modification of each of the components can have an effect on the resultant pattern of the transmitted spectral energy.

In another embodiment, and for purposes herein, minima of energy may be determined and/or identified via a combination of experiments and/or computational modeling. Computational models can be based on molecular dynamics simulation, for example, see Introduction to Molecular Dynamics Simulation by Michael Allen, NIC Series, Vol. 23, ISBN 3-00-012641, pp 1-28, 2004 (incorporated by reference for all purposes). Computational modeling can be used to provide the spectral energy pattern required to tune, and be in resonance, with the different types of molecular oscillations pertinent to a fluid of interest, hard water from a source X, for example.

Band-pass filters can be used to tune and replicate the energy pattern required to convert the first crystal pattern to the second crystal pattern. Band-pass filters can be tuned by modifying the composition of the filter, modifying the total weight of material present in the filter, modifying the length of the filter in contact with the water, modifying the thickness of the filter material in contact with the water, modifying the intervening metal between the band-pass filter and the water, and the like. Tuning is also modified by the type and extent of the external energy. Each of the above parameters is taken into account when designing the proper band-pass filter for any given use.

Embodiments also include design of multiple band-pass filters (or one band-pass filter with different portions) that transmit different energy patterns required to convert two or more first crystal polymorphs to two or more second (more stable) crystal polymorphs.

In one embodiment, a sample from a target liquid source is obtained and tested using Hard X-ray experiments, for example tested using the Hard X-ray device at the Department of Energy Laboratories at Argonne. The tested sample will provide a measure of the various crystal polymorphs present in the target liquid source. In an illustrative X-ray powder diffraction pattern for $CaCO_3$ in water, the X-ray diffraction shows the presence of aragonite, calcite and vaterite. In some embodiments, quantitative phase analysis is further used to identify the relative quantities of each crystal present in the target liquid source.

It is also envisioned that hard X-rays and Pair Distribution Function Analysis can be combined on the sample to provide additional information regarding crystal polymorphs. Using this combined procedure, unique fingerprint data on a crystal polymorph pair can be obtained, which is then used to determine the polymorph's distribution within the liquid source.

It is also envisioned that embodiments can include the use of flow simulator testing on samples, including the use of the F5 Technology Flow Simulator, particle sizer data, zeta-potential data, high resolution scanning electron microscopy data and the like. Using these data points, a target source liquid can be fully resolved to identify all possible crystal polymorphs in need of conversion using the band-pass filter embodiments described herein.

Using the crystal polymorph data as a before treatment indicator, the sample, having identified and quantified crystal polymorphs, can be tested using input spectral energy patterns (frequencies) to identify an optimized energy pattern for obtaining thermodynamically stable crystal polymorphs. In this embodiment, a series of energy patterns are input into the liquid, and samples obtained. The treated liquid samples would then be re-tested using the same techniques as above, and compared to the before treatment sample. After a series of systematic tests, an optimal spectral energy pattern will be identified for the conversion of a first crystal polymorph to a more stable second crystal polymorph. The identified spectral energy pattern can then be matched to a corresponding band-pass filter known to exhibit the same or similar spectral energy pattern. In some embodiments, the testing and treatment of two or more crystal polymorphs, three or more crystal polymorphs, and the like, can be performed.

In alternative embodiments, the before treatment water data is compared to samples from the same water source after treatment by a passive external energy passing through a band-pass filter. Band-pass filter parameters would be modified to provide a series of filters that exhibit different transmitted frequencies/spectral energy patterns. As above, results are compared so as to identify the optimal band-pass filter for a particular water source by comparing the ratio of a first crystal polymorph to a more thermodynamically stable version of the first crystal polymorph. As above, multiple crystal polymorphs may be identified and treated in the same water source.

In another embodiment, Molecular Dynamic Simulations can be used to predict the natural vibrational frequencies of monomer units and aggregates identified by Hard X-ray experiments, or where available, known crystal units for a water source. Using Molecular Dynamic Simulations, the frequencies or spectral energy patterns required to tune a band-pass filter to a particular fluid source can be identified. For example, using Molecular Dynamic Simulations to identify the frequency required to convert asphaltene dimers to a more stable asphaltene nanoaggregate, where the source liquid has asphaltene concern (either through post identification of precipitation or identification by hard X-ray experiments (and the like)).

It is also envisioned that the same type of experimental procedures can be used to reduce a water's interfacial tension or surface tension. As an illustrative embodiment, water can be treated using various spectral energy patterns to identify the best pattern for reducing the energy requirements for heating the water to a boil. Other interfacial or surface tension testing techniques can be utilized.

Embodiments herein will now be further described with reference to the following non-limiting examples.

EXAMPLES

Example 1: Band-Pass Filter Treated Water Shows Enhanced Evaporation Compared to Untreated Water Two identical flasks of water were prepared, each flask containing 500 g of water at ambient temperature. One of the flasks of water was briefly exposed to, and surrounded by, a band-pass filter in accordance with embodiments herein (see Table 1). Each of the two flasks was then heated on an identical heating plate (Toastmaster 750 W Electric Heat Plate) for 45 minutes. Heating plates were positioned on high.

After 45 minutes, water that remained in the flask was weighed to determine the weight of evaporated water from each flask. The experiment was performed three times and weights averaged.

Results indicate that untreated water had 136.8 g evaporated after heating, and 150.8 g of water evaporated for the band-pass filter treated water. The water treated with the band-pass filter showed a 10% increase in evaporation as compared to the untreated water. Based on that number, it can be calculated that band-pass filter treated water takes an average of 6.8% less time to reach the same temperature.

Based on this testing, the band-pass filter saved 10% energy to generate the same amount of steam or evaporated water as the untreated water. In similar testing, observations have been made on industrial boilers that also show a reduction in time to evaporate, where the water was pre-treated with a band-pass filter. The water in the boiler also showed a significant reduction in scale build-up where the water was pre-treated with a band-pass filter in accordance to embodiments herein.

Example 2: Band-Pass Filter Treated Water Shows Prevention and Remediation of Scale A band-pass filter in accordance with embodiments herein (see Table 1) was placed on the water input for a house. The band-pass filter was attached to the pipe and was exposed to an external energy source (sunlight). Water was sampled before and after band-pass filter attachment. The water prior to band-pass filter attachment showed calcite crystallites of $CaCO_3$. The same water supply, after band-pass filter attachment, showed that most if not all of the calcite crystallites had been converted to aragonite crystallites of $CaCO_3$.

In a similar manner, water was tested for barium sulfate crystals formed in water pre- and post- treatment with a band-pass filter in accordance with embodiments herein. Water samples prior to band-pass filter treatment show the presence of significant amounts of barium sulfate crystals, whereas, band-pass filter treatment resulted in conversion of barium sulfate crystals to barium sulfate crystals in an alternative polymorphism. The Example shows the benefit of converting less thermodynamically stable crystals to more thermodynamically stable crystals, with the overall potential to reduce scale build-up on the house water pipes.

What is claimed is:

1. A method, comprising:
    identifying a first minima energy level of a first crystal form of an element, compound or a combination thereof in water;
    identifying a second minima energy level of a second crystal form of the element, compound or a combination thereof in the water; and
    determining at least one spectral energy pattern from a passive energy source used to convert the first crystal form to the second crystal form;
    transmitting a passive energy through a band-pass filter to obtain the at least one spectral energy pattern from the passive energy source; and
    targeting the first crystal form in the water with the at least one spectral energy pattern thereby converting the first crystal form to the second crystal form, wherein:
    the second crystal form is thermodynamically more stable in the water compared to the first crystal form;
    the at least one spectral energy pattern from the passive energy source results in the second crystal form in the water having a greater solubility in the water, as compared to the first crystal form in the water; and
    the at least one spectral energy pattern from the passive energy source has a resonant frequency selected from one or more of a near-infrared frequency, a mid-infrared frequency, a far-infrared frequency, or a combination thereof.

2. The method of claim 1, wherein:
    the at least one spectral energy pattern has no effect on a kinetic stability of the first crystal form or the second crystal form.

3. The method of claim 1, wherein the second crystal form is aragonite.

4. The method of claim 1, wherein the at least one spectral energy pattern is a far-infrared energy pattern.

5. The method of claim 1, wherein:
    at least one non-polar solvent is in the water; and
    the at least one spectral energy pattern lowers an interfacial tension between the at least one non-polar solvent and the water.

6. The method of claim 1, wherein the water is located in an input pipe to a dwelling.

7. The method of claim 1, wherein:
    at least one polar solvent is in the water; and
    the at least one polar solvent is different from water.

8. The method of claim 1, wherein the band-pass filter comprises:
    an alloy having the following formula:

Al(MXZ)c wherein:
    Al is aluminum at a weight percent of from about 85 wt % to 90 wt %;
    M is at least one element selected from a transition metal; Si, Mg, Pb, or Sn;
    X is at least one element selected from a group comprising Be, Mg, Ca, Sr, Ba, Ra, or a combination thereof;
    Z is at least one non-metal; and
    c is about 10 to 15 wt %.

9. The method of claim 8, wherein the at least one element is selected from Si, Fe, Cu, Mn, Mg, Cr, Ni, Zn, Ti, Pb, or Sn.

10. The method of claim 1, wherein the band-pass filter has a total weight of between 30 and 60 pounds.

11. The method of claim 1, wherein the passive energy is predominantly from sunlight.

12. The method of claim 1, wherein the at least one spectral energy pattern lowers an interfacial tension of the water.

13. The method of claim 1, wherein:
the band-pass filter is comprised of 85 to 90 weight percent aluminum, and 10 to 15 weight percent of one or more of at least one element selected from a group comprising Si, Fe, Cu, Mn, Mg, Cr, Ni, Zn, Ti, Pb, and Sn.

14. The method of claim 1, wherein the water comprises calcite and aragonite.

15. The method of claim 1, wherein the water is drinking water for use in a residential property.

16. The method of claim 1, wherein the resonant frequency is the near-infrared frequency.

17. The method of claim 1, wherein:
transmitting the at least one spectral energy pattern treats the water by converting the first crystal form to the second crystal form;
the water treated by the at least one spectral energy pattern is a treated water source; and
the treated water source, after leaving the band-pass filter, is used to generate electricity.

18. The method of claim 17, wherein the water from the treated water source passes from the band-pass filter to a water heater.

19. The method of claim 1, wherein the resonant frequency is a resonant frequency of the first crystal form.

20. The method of claim 3, wherein the first crystal form is calcite.

* * * * *